Patented Oct. 19, 1943

2,332,302

UNITED STATES PATENT OFFICE 2,332,302

CONDENSATION PRODUCT OF AN AMINO-TRIAZOLE, AN ALDEHYDE, AND A HALO-GENATED AMIDE

Gaetano F. D'Alelio, Pittsfield, Mass., assignor to General Electric Company, a corporation of New York No Drawing. Application October 21, 1941, Serial No. 415,938

20 Claims. (Cl. 260—42)

This invention relates to new condensation products and to methods of making the same. The invention is concerned more particularly with self-curing aminoplasts, by which are meant heat-convertible resinous condensation products prepared from amino or amido compounds and having the characteristic property of curing under heat or under heat and pressure without the addition of a curing accelerator or catalyst.

In my copending application Serial No. 289,277, filed August 9, 1939, now Patent No. 2,285,418, issued June 9, 1942, and assigned to the same assignee as the present invention, I disclosed and claimed new and useful compositions of matter comprising a condensation product of ingredients comprising (1) a urea, specifically the compound corresponding to the formula $CO(NH_2)_2$, (2) an aliphatic aldehyde, e. g., formaldehyde, and (3) certain halogenated amides, more particularly chlorinated acetamides. The present invention is directed to new and useful condensation products wherein an aminotriazole (amidogentriazole) is caused to react with an aldehyde in the presence of a halogenated amide of the kind hereafter mentioned.

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing an aminotriazole (that is, an aldehyde-reactable aminotriazole), an aldehyde, including polymeric aldehydes and aldehyde-addition products, and a halogenated amide selected from the class consisting of alpha halogenated amides, beta halogenated amides and alpha beta halogenated amides, which amides contained at least one —$CONH_2$ grouping. Examples of such halogenated amides are the halogenated acetamides, more particularly the mono-, di- and tri-chloracetamides, the mono-, di- and tri-bromoacetamides, the mono-, di- and tri-iodoacetamides, the mono-, di- and tri-fluoroacetamides, and similar halogeno derivatives of other amidated monocarboxylic and polycarboxylic acids such as propionic, butyric, valeric, malonic, adipic, maleic, itaconic, fumaric, tricarballylic, etc., acids. In all cases the amide grouping of the halogenated amide is capable of reaction with the aldehydic component, since this amide grouping possesses a nitrogen atom to which are attached two hydrogen atoms.

It has been suggested heretofore that aminotriazolealdehyde condensation products by modified by incorporating therein an amide, specifically urea, thiourea, dicyandiamide and the like. However, to the best of my knowledge and belief it was not known or suggested prior to my invention to intercondense an alpha halogenated amide, a beta halogenated amide or an alpha, beta halogenated amide, which amides contain at least one —$CONH_2$ grouping, with an aminotriazole and an aldehyde thereby to obtain an inter-condensation product of accelerated curing characteristics. I am aware that it was suggested prior to my invention to prepare urea-formaldehyde molding compositions containing various compounds capable of developing acidity during the molding operation and that iso-dibrom succinic anilide specifically has been mentioned as a compound having this characteristic property. Iso-dibrom succinic anilide is different from, and is not the equivalent of, the halogenated amides used in carrying the present invention into effect. Salts of the mono- and di-halogenated aliphatic carboxylic acids, for example sodium and ammonium mono-chloroacetates, also have been suggested as addition agents to urea-formaldehyde molding compositions to yield heat-convertible masses that cure to an insoluble, infusible state under the heat and pressure of molding. Such salts likewise are entirely different from, and are not the equivalent of, the halogenated amides required for practicing the present invention. These salts are latent catalysts and, unlike the amides which I use, are incapable of condensation with an aldehyde.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in aminoplasts of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced prices is of considerable commercial importance.

The resin syrups and molding compositions of this invention may be stored for long periods of time without material alteration. In marked contrast the prior heat-convertible aminoplasts of the aminotriazole-aldehyde type, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Furthermore, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction then is caused to proceed further to produce the self-curing aminoplasts of this invention.

In obtaining the neutral, alkaline or acid conditions above described I may use, for example, ammonia, sodium hydroxide or carbonate, calcium hydroxide, methylamine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, rotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance condensation catalysts, fillers, plasticizers, other natural or synthetic resinous bodies, solvents or diluents, etc. A preferred method is to add the halogenated amide to a partial condensation product of an aminotriazole and an aldehyde and effect further condensation between the components. In producing such a partial condensation product I advantageously may cause the condensation reaction between the aminotriazole and the aldehyde to take place in the presence of a primary condensation catalyst and a secondary condensation catalyst. The primary catalyst preferably is either an aldehyde-non-reactable, nitrogen-containing basic tertiary compound, e. g., tertiary amines such as trialkyl (e. g., trimethyl, triethyl, etc.) amines, triaryl (e. g., triphenyl, etc.) amines, etc., or an aldehyde-reactable nitrogen-containing basic tertiary compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance a carbonate cyanide or hydroxide of an alkali metal (e. g., sodium, potassium, lithium, etc.).

Another method of effecting reaction between the ingredients comprises first condensing the halogenated amide with the aldehyde, adding the resulting partial condensation product to an aminotriazole-aldehyde partial condensation product and then causing the reaction to proceed further. Or, I may condense or partially condense the halogenated amide with a mol excess of an aldehyde, add an aminotriazole to this condensation product and effect further reaction between the components. Still other ways may be employed in combining the components and in producing the unmodified and modified condensation products of this invention, as will be readily understood by those skilled in the art as the description of the invention proceeds. These condensation reactions may proceed under a wide variety of time, temperature and pressure conditions. The temperature of the reaction may vary from room temperature to the reflux temperature of the reactants at reduced, atmospheric or superatmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble, infusible state.

Depending upon the particular reactants employed and the particular conditions of reaction, the intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. These liquid compositions may be used, for instance, as surface-coating materials, in the production of paints, varnishes, lacquers, enamels, etc., for general adhesive applications, as anti-creasing agents, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

*Example 1*

| | Parts |
|---|---|
| 1-carbamyl guanazole | 32.4 |
| Aqueous formaldehyde (approx. 37.1% HCHO) | 73.9 |
| Aqueous ammonia (approx. 28% NH₃) | 3.2 |
| Sodium hydroxide in 2.5 parts water | 0.05 |
| Chloroacetamide (monochloroacetamide) | 0.5 |

All of the above components with the exception of the chloroacetamide were heated together under reflux at the boiling temperature of the mass for 15 minutes. The chloroacetamide was added to the resulting syrup and refluxing was continued for an additional 5 minutes to cause the chloroacetamide to intercondense with the 1-carbamyl guanazole-formaldehyde partial condensation product.

A molding compound was made from the syrupy condensation product containing the intercondensed chloroacetamide by mixing it with 35.5 parts alpha cellulose in flock form and 0.2 part of a mold lubricant, specifically zinc stearate. The wet compound was dried at 60° C. for 3½ hours. A sample of the dried compound was molded at 135° C. for 3 minutes under a pressure of 2,000 pounds per square inch. The molded piece was hard and well cured throughout, was exceptionally light in color and had excellent gloss. When this molded piece was tested for water resistance by immersing it in boiling water for 15 minutes, it absorbed only 1.7% by weight of water. There was no change in its color or gloss or any other visible evidence that it had been affected in any way by this rigid test. The molded piece was uniform and well knitted together and showed good plastic flow during molding.

Example 2

| | Parts |
|---|---|
| 3-N-(para-sulfamyl phenyl) guanazole | 55.5 |
| Aqueous formaldehyde (approx. 37.1% HCHO) | 53.0 |
| Aqueous ammonia (approx. 28% NH₃) | 6.5 |
| Sodium hydroxide in 15 parts water | 0.2 |
| Chloroacetamide | 0.5 |

All of the above components with the exception of the chloroacetamide were heated together under reflux at boiling temperature for 30 minutes. The chloroacetamide was now added and refluxing was continued for an additional 5 minutes. The resulting syrupy condensation product was mixed with 35 parts alpha cellulose and 0.2 part zinc stearate to form a molding compound. The wet compound was dried at 60° C. for 1 hour. Well-cured molded pieces having excellent gloss and strength were produced by molding samples of the dried compound for 5 minutes at 130° C. under a pressure of 2,000 pounds per square inch. When dichloroacetamide or trichloroacetamide was substituted for the monochloroacetamide in the above formulation, resinous syrups were obtained that rapidly cured to the insoluble, infusible state when tested at 140° C. on a hot-plate.

Example 3

| | Parts |
|---|---|
| 1-(meta-tolyl) guanazole | 143 |
| Aqueous formaldehyde (approx. 37.1% HCHO) | 181 |
| Aqueous sodium hydroxide solution (0.46N) | 8 |
| Monochloroacetamide | 2 |

The above ingredients were heated on a steam plate for about 1 minute to dissolve all the solids and to partly resinify the mass. The syrup so obtained was mixed with 105 parts of alpha cellulose in flock form and 2 parts zinc stearate and dried at room temperature. A sample of the dried compound was molded at 135° C. for 5 minutes under a pressure of 3,500 pounds per square inch. The molded piece was well cured and exhibited good flow during the molding cycle. When subjected to the boil test as described under Example 1, the molded piece absorbed only 0.55% by weight water. When the above example was repeated but using 143 parts 1-(ortho-tolyl) guanazole or 1-(para-tolyl) guanazole or 169 parts 1-(alpha-naphthyl) guanazole or 1-(beta-naphthyl) guanazole in place of 143 parts 1-(meta-tolyl) guanazole, comparable molded pieces were obtained.

Example 4

Same formula and procedure as in Example 3 with the exception that 1 part trichloroacetamide were used instead of 2 parts monochloroacetamile. The wet molding compound was dried overnight at room temperature. A sample of the dried compound was molded for 5 minutes at 135° C. under a pressure of 3,500 pounds per square inch, yielding a well-cured molded piece similar to that obtained in Example 3.

Example 5

| | Parts |
|---|---|
| 1-(ortho-tolyl) guanazole | 142 |
| Aqueous formaldehyde (approx. 37.1% HCHO) | 181 |
| Aqueous sodium hydroxide solution (0.465 N) | 8 | were heated together for several minutes to yield a clear syrup which separated from the aqueous layer. When a sample of this syrup was mixed with from 1 to 2% by weight thereof of alpha, beta-dichloropropionamide and heated on a 135° C. hotplate, the syrup bodied to a resinous mass that upon further heating was converted to a cured (insoluble and infusible) state.

Example 6

Same as Example 5 with the exception that from 1 to 2% by weight (of the syrup) of alpha, beta-dibromopropionamide was used instead of alpha, beta-dichloropropionamide. The resinous mass cured rapidly to an insoluble, infusible state upon heating on a 135° C. hotplate.

Example 7

| | Parts |
|---|---|
| 1-carbamyl guanazole | 107.0 |
| Aqueous formaldehyde (approx. 37.1% HCHO) | 486.0 |
| Para-amino benzene sulfonamide | 129.0 |
| Sodium hydroxide in 20 parts water | 0.4 |
| Chloroacetamide | 4.0 |

All of the above components with the exception of the chloroacetamide were heated together under reflux at the boiling temperature of the mass for 10 minutes. The chloroacetamide was now added and refluxing was continued for an additional 3 minutes. A molding (moldable) compound was made by mixing the resulting hot resinous syrup with 241 parts alpha cellulose and 2 parts zinc stearate. The wet compound was dried at 60 C. for several hours. A sample of the dried compound was molded for 3 minutes at 130° C. under a pressure of 2,000 pounds per square inch. The molded piece was well cured throughout and showed good plastic flow during molding. The para-amino benzene sulfonamide functions as an intercondensable plasticizer to improve the plasticity of the compound during molding.

Example 8

| | Parts |
|---|---|
| 1-carbamyl guanazole | 60.0 |
| Water | 1,000.0 |
| Dimethylol urea (containing 11% water) | 404.0 |
| Aqueous ammonia (approx. 28% NH₃) | 6.0 |
| Sodium hydroxide in 13 parts water | 0.25 |
| Chloroacetamide | 3.0 |

The same procedure was followed in making the syrup, molding compound and molded article as described in Example 7 with the exception that the reflux time after addition of the chloroacetamide was 5 minutes and the amount of alpha cellulose was 170 parts. A well-cured molded piece that could be pulled hot from the mold without distortion was obtained.

*Example 9*

|  | Parts |
|---|---|
| 3-N-(para-acetamino phenyl) guanazole | 46.4 |
| Aqueous formaldehyde (approx. 27.1% HCHO) | 162.0 |
| Aqueous ammonia (approx. 28% NH₃) | 10.0 |
| Sodium hydroxide in 5 parts water | 0.1 |
| Urea | 48.0 |

All of the above components were heated together under reflux at the boiling temperature of the mass for 15 minutes. At the end of this reaction period 1 part chloroacetamide was added to 115 parts of the syrup and refluxing was continued for an additional 5 minutes. A molding compound was made by mixing the resulting hot resinous syrup with 35 parts alpha cellulose and 0.2 part zinc stearate. The wet compound was dried at 65° C. for 1 hour. A sample of the dried compound was molded for 5 minutes at 130° C. under a pressure of 2,000 pounds per square inch. The molded piece was pulled hot from the mold. It did not become distorted upon cooling to room temperature. It was well cured throughout and had an attractive appearance.

*Example 10*

|  | Parts |
|---|---|
| 3-N-(para-hydroxy phenyl) guanazole | 38.2 |
| Urea | 108.0 |
| Aqueous formaldehyde (approx. 37.1% HCHO) | 324.0 |
| Aqueous ammonia (approx. 28% NH₃) | 14.0 |
| Sodium hydroxide in 12 parts water | 0.24 |

All of the above components were heated together under reflux at boiling temperature for 30 minutes. To 230 parts of the syrup was added 1 part chloroacetamide. The hot resinous syrup was mixed with 70 parts alpha cellulose and 0.4 part zinc stearate to form a molding compound. The wet compound was dried at 64° C. for 2½ hours to yield a molding compound that could be satisfactorily molded. A well-cured molded piece was produced by molding a sample of the dried compound for 5 minutes at 130° C. under a pressure of 2,000 pounds per square inch.

*Example 11*

|  | Parts |
|---|---|
| 1-phenyl guanazole | 13.1 |
| Urea | 30.0 |
| Aqueous formaldehyde (approx. 37.1% HCHO) | 63.0 |
| Aqueous ammonia (approx. 28% NH₃) | 3.0 |
| Aqueous sodium hydroxide solution (0.46 N) | 2.5 |
| Chloroacetamide | 0.2 |

The above ingredients, with the exception of the 1-phenyl guanazole and the chloroacetamide, were refluxed for 5 minutes. The quanazole and the chloroacetamide were added and the mixture heated until the clear solution became milky. The syrup was mixed with 35 parts alpha cellulose and 0.2 part zinc stearate to form a molding compound. After drying at 70° C., a sample of the molding compound was molded at 135° C. for 5 minutes at a pressure of 3,000 pounds per square inch. A molded piece that was well cured and homogeneously knit was obtained.

Similar results were obtained when 14.1 parts of 1-(para-tolyl) guanazole were substituted for the 13.1 parts 1-phenyl guanazole in the above example.

*Example 12*

|  | Parts |
|---|---|
| 3-N-(para-sulfamyl phenyl) quanazole | 12.7 |
| Urea | 27.0 |
| Aqueous formaldehyde (approx. 37.1% HCHO) | 81.0 |
| Aqueous ammonia (approx. 28% NH₃) | 2.0 |
| Sodium hydroxide in 4 parts water | 0.08 |
| Chloroacetamide | 0.5 |

All of the above ingredients with the exception of the chloroacetamide were heated together under reflux for 30 minutes. The chloroacetamide was now added to 115 parts of the clear resinous syrup and the refluxing continued for an additional 5 minutes. The resulting hot syrup was mixed with 35 parts alpha cellulose and 0.2 part zinc stearate to form a molding compound. The wet compound was dried at 60° C. for 1 hour. Well-cured, translucent molded pieces were produced by molding samples of the dried compound at 130° C. for 5 minutes under a pressure of 2,000 pounds per square inch.

*Example 13*

|  | Parts |
|---|---|
| 1-phenyl guanazole | 131 |
| Formaldehyde-addition product, specifically reformed dimethylol urea (containing 11% water) | 404 |
| Water | 500 |
| Chloroacetamide | 2 | were heated together until the clear solution became milky. The hot syrup was mixed with 285 parts alpha cellulose in flock form and 2 parts zinc stearate to form a molding compound. The wet compound was dried at 70° C. A sample of the dried compound was molded at 135° C. for 4 minutes under a pressure of 3,500 pounds per square inch, yielding an excellently cured molded article that showed good flow characteristics during molding. The molded piece did not disintegrate nor show any material change in surface appearance when immersed in boiling water for 15 minutes. On an accelerated test to determine its relative resistance to water, it showed only 1.2% water absorption. (The water absorption value is determined by immersing a weighed sample of the molded article for 15 minutes in boiling water, immersing immediately in cold water for 5 minutes, after which the sample is wiped dry, weighed immediately and the percentage increase in weight recorded as the per cent water absorbed.)

*Example 14*

|  | Parts |
|---|---|
| 1-(para-tolyl) guanazole | 142 |
| Preformed dimethylol urea (containing 11% water) | 404 |
| Chloroacetamide | 2 |
| Water | 500 |

All of the above components were heated together for several minutes, by which time the resin started to precipitate.

A molding compound was made by mixing the syrup produced as described above with 300 parts alpha cellulose and 2 parts zinc stearate. The wet compound was dried for several hours at 60°

C. A well-cured molded piece having good water resistance was obtained by molding a sample of the dried compound for 5 minutes at 135° C. under a pressure of 2,000 pounds per square inch. Similar results were obtained when 142 parts 1-(ortho-tolyl) guanazole or 1-(meta-tolyl) guanazole or 163 parts 1-(alpha-naphthyl) or 1-(beta-naphthyl) guanazole were substituted for the 142 parts 1-(para-tolyl) guanazole in the above example.

*Example 15*

| | Parts |
|---|---|
| 1-phenyl guanazole | 13.1 |
| Aqueous formaldehyde (approx. 37.1% HCHO) | 18.1 |
| Aqueous sodium hydroxide solution (0.46 N) | 0.8 |
| Chloroacetamide | 0.3 |

The above ingredients were heated until a resin was obtained that was solid when cooled to room temperature. The resin was completely dissolved in dioxane and added to another solution containing 20 parts of a polyvinyl acetal, specifically polyvinyl formal, in dioxane. After evaporating the solution to dryness, the solid was sheeted on differential rolls, the front roll of which was heated at 75° C., until a completely homogeneous mass was obtained. A sample of the resin was molded at 135° C. for 5 minutes at a pressure of 3,500 pounds per square inch. The mold was cooled before removing the molded piece to prevent distortion since the piece was quite flexible.

*Example 16*

| | Parts |
|---|---|
| 1-phenyl guanazole | 13.1 |
| Aqueous formaldehyde (approx. 37.1% HCHO) | 18.1 |
| Aqueous sodium hydroxide solution (0.46 N) | 0.8 |
| Chloroacetamide | 0.2 | were heated together for several minutes. A molding compound was made from the resulting syrup by mixing it with 10.5 parts alpha cellulose and 0.2 part zinc stearate. The wet compound was dried at 70° C. A sample of the dried compound was molded at 135° C. under a pressure of 3,000 pounds per square inch for 5 minutes, yielding a well-cured molded article having a smooth, glossy surface appearance. The molding compound showed excellent flow characteristics during molding. The molded article also had excellent water resistance as shown by the fact that, when immersed in boiling water for 15 minutes and then in cold water for 5 minutes, it absorbed only 1.4% by weight of water.

*Example 17*

| | Parts |
|---|---|
| 1-(ortho-tolyl) guanazole | 142 |
| Aqueous formaldehyde (approx. 37.1% HCHO) | 181 |
| Aqueous sodium hydroxide solution 0.465 N | 8 | were heated together for several minutes to yield a clear syrup which separated from the aqueous layer. When a sample of this syrup was mixed with from 1 to 2% by weight thereof of chloroacetamide (monochloroacetamide) and heated on a 135° C. hotplate, the syrup bodied to a resinous mass that upon further heating cured to an insoluble, infusible state. When individual samples of the syrup were similarly treated with dichloroacetamide and trichloroacetamide, the resin was converted to an insoluble and infusible state, although the cure time was a little longer than with chloroacetamide.

It will be understood, of course, that the halogenated amides mentioned in the above examples are only by way of illustration and that other halogenated amides selected from the class consisting of alpha halogenated amides, beta halogenated amides and alpha beta halogenated amides, which amides contain at least one —COHN₂ grouping, may be used in carrying this invention into effect. Additional examples of such halogenated amides are:

Alpha chloropropionamide
Beta chloropropionamide
Alpha dichloropropionamide
Beta dichloropropionamide
Alpha bromopropionamide
Beta bromopropionamide
Alpha dibromopropionamide
Beta dibromopropionamide
Alpha chlorobutyramide
Beta chlorobutyramide
Alpha dichlorobutyramide
Beta dichlorobutyramide
Alpha, beta dichlorobutyramide
Alpha bromobutyramide
Beta bromobutyramide
Alpha dibromobutyramide
Beta dibromobutyramide
Alpha, beta dibromobutyramide
Beta trichloropropionamide
Beta tribromopropionamide
Alpha chloro, beta dichloro propionamide
Alpha bromo, beta dibromo propionamide
Alpha chloro, beta bromo propionamide
Beta iodopropionamide
Alpha chlorovaleramide
Beta bromovaleramide
Alpha dichlorovaleramide
Beta dichlorovaleramide
Alpha dibromovaleramide
Beta dibromovaleramide
Alpha, beta dichlorovaleramide
Alpha chloromalonic diamide
Alpha bromomalonic diamide
Alpha fluoroadipic diamide
Alpha chloromaleic diamide
Alpha dichloroadipic diamide
Beta dichloroadipic diamide
Alpha, beta dibromopyrotartaric diamide
Alpha, beta dichloropyrotartaric diamide
Alpha, alpha', alpha'' tribromocarballylic triamide
Alpha, alpha', alpha'' trichlorocarballylic triamide
Alpha chloroaceto-acetamide
Alpha chlorohydantoic amide
Alpha bromoaceto-acetamide
Alpha bromohydantoic amide
Alpha chloro, beta chloro adipic diamide It also will be understood that in each of the specific halogenated amides above mentioned the particular halogen shown may be replaced by some other halogen, care being taken in the choice of the halogen in the light of the properties desired in the final products. For example, when light-colored molded articles are desired, the use of iodo derivatives should be avoided and when the heat-convertible resins are to be used in the production of molding compositions, the fluoro derivatives preferably are avoided.

Where a plurality of halogen atoms are present in the halogenated amide, these may be the same or different. For example, one halogen in the molecule may be chlorine and another bromide. In this way it is possible to obtain a heat-convertible resin of self-curing characteristics and other properties best adapted to meet a particular molding problem and service application of the finished article.

Likewise, it also will be understood that the aminotriazoles named in the above examples are by way of illustration and that any other aldehyde-reactable aminotriazole may be employed. I prefer to use triazoles containing either at least one unsubstituted amidogen (–NH₂) group or a plurality of partly substituted amidogen groups. Examples of such triazoles which may be used in producing the new synthetic materials of this invention are guanazole, 3-hydrazino 1,2,4-triazole, 3-amino 1,2,4-triazole, 1-phenyl 5-amino 1,2,3-triazole, 5-amino 3-oxy 1,2,4-triazole, 1-amino 1,2,3-triazole; derivatives of guanazole, e. g., 3,5-dihydrazino 1,2,4-triazole, guanazo-guanazole, imidurazo-guanazole, 4-phenyl 3,5-dianilino 1,2,4-triazole, etc.; nuclearly substituted amino-triazoles, e. g. 4-p-tolyl 3,5-di-p-toluidino 1,2,4-triazole, 1,4-diphenyl 3-anilino 5-phenyl-imino 1,2,4-triazole, 2-methyl 1-phenyl guanazole, 1-phenyl 3-amino 5-methyl 1,2,4-triazole, 2-phenyl 5-amino 4-methyl 1,2,3-triazole, 1-phenyl guanazole, the 1-tolyl guanazoles, the 1-naphthyl guanazoles, 1-phenyl 3-amino 1,2,4-triazole, 3,4-diamino, 1,2,4-triazole, 2-phenyl 4, 5-diamino 1,2,3-triazole; poly-amino triazoles wherein the hydrogen atoms of one or all of the amino groups are partially substituted by other amino groups, e. g., 3,5-dihydrazino 4-amino 1,2,4-triazole, 3-hydrazino 5-amino 1,2,4-triazole, 4-hydrazino 5-amino 1,2,3-triazole, etc., polyamino triazoles wherein the hydrogen atoms of one or all of the amino groups are partially substituted by other monovalent substituents (e. g. alkyl, aryl, aralkyl, etc.), for instance 1-phenyl 5-amino 3-anilino 1,2,4-triazole; 1-phenyl 5-amino 3-p-toluidino 1,2,4-triazole, 4-β-naphthyl 3,5-di(β-naphthyl-amino) 1,2,4-triazole, 2-phenyl 4-amino 5-acet-amino 1,2,4-triazole.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, thioureas, selenoureas and iminoureas (numerous examples of which are given in my copending application Serial No. 377,524, filed February 5, 1941, and assigned to the same assignee as the present invention), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Particularly good results are obtained with active methylene-containing bodies such as mono- and di-methylol ureas and the methylol melamines, e. g., mono-, di-, tri-, tetro-, penta- and hexa-methylol melamines. Mono- or poly- (N-carbinol) derivatives, specifically the mono- or poly-methylol derivatives, of an aminotriazole as, for instance, a methylol guanazole may be caused to react with the halogenated amides used in carrying the present invention into effect, in which case it is not necessary to use an aminotriazole and an aldehyde as individual starting reactants. Mixtures of aldehydes and aldehyde-addition products may be employed, for example mixtures of formaldehyde and methylol compounds such, for instance, as dimethylol urea, dimethylol guanazole and trimethylol melamine.

A part of the aminotriazole reactant may be replaced if desired by, for example, a urea, e. g., urea (NH₂CONH₂), thiourea, selenourea, iminourea, and aldehyde-reactable substitution products thereof, e. g., methyl urea, phenyl thiourea, etc., by aldehyde-addition products of a urea, e. g., dimethylol urea, etc., or by other organic compounds capable of reacting with an aldehyde, e. g., an amino pyrimidyl carbamyl-alkyl sulfide. Numerous examples of compounds embraced by the term "a urea" are given in my copending application Serial No. 289,277. I may use either a single or a plurality of halogenated amides with the aminotriazole reactant or with the aminotriazole and urea reactants. Various aminodiazines, aminodiazoles or aminotriazines may be used in place of a part of the aminotriazole.

The ratio of the aldehydic reactant to the aminotriazole may be considerably varied but, in general, it is desirable to use at least one mol of an aldehyde for each mol of aminotriazole. In producing the heat-convertible resinous condensation products of this invention, the proportion of the halogenated amide in all cases is at least sufficient to render the resin convertible under heat to an insoluble, infusible state. Ordinarily not exceeding substantially ⅛ mol halogenated amide is used for each mol of aminotriazole. No advantage accrues from using an amount of halogenated amide above the minimum required to secure the desired curing rate. Further, the use of higher amounts of halogenated amide is undesirable for most molding applications because of the greater difficulty in obtaining molded articles of suitable hardness, but may not be objectionable for other applications of the material. Also, in some cases, particularly where high molecular weight halogenated amides as for example alpha chlorostearamide are used, the amide part of the resin molecule exceeds on a weight basis the aminotriazole portion of the molecule. Consequently, in such cases the inherent characteristics (for example, waxy nature) of the high molecular weight halogenated amide predominate in the resin molecule. This may be objectionable in some applications of the molded part, for example where resistance to the ordinary organic solvents is required.

From the foregoing it will be seen that the particular mol ratio of halogenated amide to the other components is dependent somewhat upon the inherent characteristics and other properties desired in the heat-curable and heat-cured resinous condensation products. The aldehydic reactant may be used, for example, in an amount corresponding to from one to five or six mols thereof for each mol of aminotriazole.

Good results usually are obtained by using from 1½ to 3¼ mols of aldehyde, specifically formaldehyde, for each mol of aminotriazole. Taking 1-amino guanazole (an aminotriazole containing three unsubstituted amidogen groups) as illustrative of the aminotriazole, particularly good results are obtained with approximately three mols aldehyde, e. g., formaldehyde, for each mol 1-amino guanazole. If the aminotriazole contains only two unsubstituted amidogen groups (or one unsubstituted and two partly substituted amidogen groups), then one advantageously may use approximately two mols aldehyde for each mol of aminotriazole. If the aminotriazole contains only one unsubstituted amidogen group (or two partly substituted amidogen groups), then no particular advantage usually accrues from using much in excess of one mol aldehyde for each mol of such an aminotriazole. When the aldehyde is available for reaction in the form of an aldehyde-addition product such, for instance, as dimethylol urea, trimethylol melamine, etc., then higher amounts of such aldehyde-addition products ordinarily are used, for example, up to ten or twelve mols of such aldehyde-addition product for each mol of the aminotriazole.

When an aldehyde-addition product of an aminotriazole, e. g., a methylol guanazole as for instance dimethylol guanazole, is used as a reactant with a halogenated amide of the kind with which this invention is concerned, such aldehyde-addition product functions in a dual capacity in that it provides a source for the introduction of both an aminotriazole and an alkylene bridge, e. g., —CH₂—, into the resin molecule. The aldehyde-addition product may be used alone or together with an aminotriazole, or with an aldehyde or with both an aldehyde and an aminotriazole.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, isobutyl, hexyl, etc., alcohols; polyhydric alcohols such as ethylene glycol, diethylene glycol, glycerine, pentaerythritol, polyvinyl alcohol, etc.; amides such as formamide, acetamide, stearamide, acrylamide, benzamide, toluene sulfonamides, benzene disulfonamides and trisulfonamides, adipic diamide, phthalamide, etc.; amines, e. g., ethylene diamine, aniline, phenylene diamine, etc.; phenol and substituted phenols, e. g., the aminophenols, the cresols, the xylenols, the tertiary alkyl phenols and other phenols such as mentioned in my Patent 2,239,441; ketones; nitriles, e. g., acrylonitrile, methacrylonitrile, succinonitrile, etc.; and others. Those modifying agents which are reactable with the aminotriazole, or with the aldehyde or with the reaction product of the aminotriazole and the aldehyde (that is, an aldehyde-addition product of the aminotriazole, e. g., dimethylol guanazole) may be incorporated into the composition by mixing all the reactants and effecting condensation therebetween or by various permutations of the reactants as described, for example, in my Patent 2,239,441 with particular reference to reactions involving a phenol, an aliphatic aldehyde and a malonic compound (page 3, column 1, lines 2—24).

The modifying bodies also may take the form of high molecular weight bodies with or without resinous characteristics, for example hydrolyzed wood products, formalized cellulose derivatives, lignin, protein-aldehyde condensation products, resinous reaction products of aldehydes, for example formaldehyde, with the aminotriazines (e. g., melamine, ammeline, etc.), alone or admixed with, for example, urea, guanazole, or urea and guanazole, resins obtained by reaction of an aldehyde with the aminodiazines (e. g., 2, 4, 6-triaminopyrimidine, 2,4-diaminoquinazoline, etc.) or with the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C., preferably from 120° to 180° C. Molding pressures may be varied considerably, but usually are within the range of 1,000 to 10,000 pounds per square inch, more particularly from 2,000 to 4,000 or 5,000 pounds per square inch.

From the foregoing description it will be seen that the present invention provides new and useful compositions of matter comprising a condensation product (in heat-curable or heat-cured state) of ingredients comprising essentially an aminotriazole (amidogentriazole), e. g., guanazole, an aldehyde, e. g., formaldehyde, and a halogenated amide selected from the class consisting of alpha halogenated amides, beta halogenated amides and alpha beta halogenated amides, which amides contain at least one —CONH₂ grouping. The scope of the invention also includes method features for the production of such condensation products. For instance, one method feature of the invention comprises effecting partial reaction between ingredients comprising an aminotriazole, specifically a guanazole, and an aldehyde, e. g., formaldehyde (or ingredients comprising a urea, specifically NH₂CONH₂, an aminotriazole and an aldehyde) in the presence of an alkaline condensation catalyst, specifically a condensation catalyst comprising ammonia and a fixed alkali, adding a small amount of one or more of the herein described halogenated amides, e. g., a halogenated acetamide such as a mono-, di- or tri-chloroacetamide or mixtures thereof, mono-, di- or tri-bromoacetamides or mixtures thereof, etc., to the resulting partial condensation product and causing the halogenated amide to intercondense with the said partial condensation product. My invention also provides thermosetting (heat-hardenable) molding compositions comprising a filler, e. g., a cellulosic filler, and a heat-curable condensation product of this invention, e. g., a heat-hardenable (heat-curable) condensation product of ingredients comprising a guanazole (or urea and a guanazole), formaldehyde or compounds engendering formaldehyde, and an alpha, a beta or an alpha and beta halogenated amide having in its molecule at least one —CONH₂ grouping, as well as molded articles of manufacture comprising the heat-set molding compositions.

The modified and unmodified resinous compositions of this invention have a wide variety of uses. For example, in addition to their use in the production of molding compositions, they may be employed as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosis materials in sheet or other form. They also may be used as impregnants for electrical coils and for other electrically insulating applications.

This application is a continuation-in-part of my copending application Serial No. 289,277, filed August 9, 1939, and assigned to the same assignee as the present invention.

What I claim as new and desire to secure by Letters Patent of the United States is:

1. A composition of matter comprising the condensation product of ingredients comprising an aminotriazole, an aldehyde and a halogenated amide selected from the class consisting of alpha halogenated amides, beta halogenated amides and alpha beta halogenated amides, which amides contain at least one —CONH₂ grouping.

2. A composition as in claim 1 wherein the condensation product is an alcohol-modified condensation product of the stated components.

3. A composition as in claim 1 wherein the aminotriazole is a guanazole.

4. A heat-curable resinous condensation product of ingredients comprising an aminotriazole, formaldehyde and a halogenated amide selected from the class consisting of alpha halogenated amides, beta halogenated amides and alpha beta halogenated amides, which amides contain at least one —CONH₂ grouping.

5. A product comprising the cured resinous condensation product of claim 4.

6. A composition comprising the product of reaction under heat of (1) a partial condensation product of ingredients comprising an aminotriazole and an aldehyde and (2) a halogenated amide selected from the class consisting of alpha halogenated amides, beta halogenated amides and alpha beta halogenated amides, which amides contain at least one —CONH₂ grouping.

7. A resinous composition comprising the product of reaction under heat of (1) a partial condensation product obtained by reaction, while admixed with an alkaline substance, of ingredients comprising a guanazole and formaldehyde, and (2) a halogenated amide selected from the class consisting of alpha halogenated amides, beta halogenated amides and alpha beta halogenated amides, which amides contain at least one —CONH₂ grouping.

8. A resinous composition comprising the product of reaction under heat of (1) a partial condensation product obtained by reaction, while admixed with a condensation catalyst comprising ammonia and a fixed alkali, of ingredients comprising a guanazole and formaldehyde, and (2) a halogenated acetamide.

9. A resinous composition obtained by condensation of ingredients comprising 1-phenyl guanazole, formaldehyde and a chlorinated acetamide.

10. A resinous composition comprising the product of condensation of ingredients comprising urea, 1-phenyl guanazole, formaldehyde and monochloroacetamide.

11. A composition comprising the product of condensation of ingredients comprising a methylol guanazole and a halogenated amide selected from the class consisting of alpha halogenated amides, beta halogenated amides and alpha beta halogenated amides, which amides contain at least one —CONH₂ grouping.

12. A composition comprising the resinous product of condensation of ingredients comprising an aminotriazole, dimethylol urea and a halogenated amide selected from the class consisting of alpha halogenated amides, beta halogenated amides and alpha beta halogenated amides, which amides contain at least one —CONH₂ grouping.

13. A resinous composition comprising the product of condensation of ingredients comprising a guanazole, dimethylol urea and a chlorinated acetamide.

14. A heat-curable resinous condensation product of ingredients comprising urea, 1-phenyl guanazole, formaldehyde and a halogenated amide selected from the class consisting of alpha halogenated amides, beta halogenated amides and alpha beta halogenated amides, which amides contain at least one —CONH₂ grouping.

15. A product comprising the cured resinous condensation product of claim 14.

16. A thermosetting molding composition comprising a filler and a heat-hardenable resinous condensation product of ingredients comprising an aminotriazole, formaldehyde and a chlorinated acetamide.

17. An article of manufacture comprising the heat-set molding composition of claim 16.

18. A method of preparing new condensation products which comprises effecting a condensation reaction between ingredients comprising an aminotriazole, an aldehyde and a halogenated amide selected from the class consisting of alpha halogenated amides, beta halogenated amides and alpha beta halogenated amides, which amides contain at least one —CONH₂ grouping.

19. The method which comprises effecting partial condensation between ingredients comprising a guanazole, urea and formaldehyde in the presence of a condensation catalyst comprising ammonia and a fixed alkali, adding a small amount of a chlorinated acetamide to the resulting partial condensation product, and causing the chlorinated acetamide to intercondense with the said partial condensation product.

20. A method as in claim 19 wherein the guanazole is 1-phenyl guanazole.

GAETANO F. D'ALELIO.

CERTIFICATE OF CORRECTION.

Patent No. 2,332,302.                                                     October 19, 1943.

GAETANO F. D'ALELIO.

It is hereby certified that error appears in the printed specification of the above numbered patent requiring correction as follows: Page 1, first column, line 43, for "contained" read --contain--; and second column, lines 1 and 2, for "aminotriazolealdehyde" read --aminotriazole-aldehyde--; line 2, for "by" read --be--; page 2, first column, line 46, for "rotonic" read --crotonic--; page 3, second column, line 11-12, for "monochloroacetamile" read --monochloroacetamide--; page 4, first column, lines 12 and 13, strike out "(approx. 27.1% HCHO"; line 68 and second column, line 10, for "quanazole" read --guanazole--; same page, second column, line 35, for "refermed" read --Preformed--; page 5, first column, line 64, before "0.465" insert an opening parenthesis; and second column, line 11, for "-COHN$_2$" read -- -CONH$_2$ --; page 6, first column, line 2, for "bromide" read --bromine--; lines 24 and 40, after "e. g." insert a comma; line 31, strike out the comma after "diamino" first occurrence; and second column, line 5, for "tetro-" read -- tetra- --; and that the said Letters Patent should be read with this correction therein that the same may conform to the record of the case in the Patent Office.

Signed and sealed this 4th day of January, A. D. 1944.

(Seal)                                                                      Henry Van Arsdale,
                                                                    Acting Commissioner of Patents.